United States Patent Office 3,600,408
Patented Aug. 17, 1971

3,600,408
LIQUID PRESERVATIVE COMPOSITION WHICH CONTAINS PENTACHLOROPHENOL
Kenneth F. Bursack and Millard L. Oldham, Wichita, Kans., assignors to Frontier Chemical Company, Division of Vulcan Materials Company, Wichita, Kans.
No Drawing. Filed June 21, 1965, Ser. No. 465,742
Int. Cl. A01n 9/26
U.S. Cl. 424—347       14 Claims

ABSTRACT OF THE DISCLOSURE

The sludging tendency of solutions of pentachlorophenol in a liquid organic solvent, such as an alkylene glycol compound or a hydrocarbon solvent or a mixture of such or similar solvents, is reduced by the addition of an aliphatic carboxylic, an alkyl sulfuric or an alkyl sulfonic acid which contains at least five carbon atoms per molecule.

---

This invention relates to compounded pentachlorophenol solutions, and particularly to improved solutions which comprise pentachlorophenol in polyalkylene glycol or other suitable solvent. Still more particularly it relates to compounded pentachlorophenol solutions showing a reduced tendency to form sludge.

Pentachlorophenol is generally useful as a fungicide, insecticide, or pesticide, and is particularly valuable as a wood preservative. It is most commonly prepared by chlorination of phenol in the presence of a Friedel-Crafts catalyst such as aluminum chloride but can also be made by hydrolysis of hexachlorobenzene. Both of these processes are well known in the art. When pentachlorophenol is to be used as a wood treating agent, it is commonly sold as a liquid concentrate containing about 15 to 50%, e.g., 30 to 42% pentachlorophenol, in a suitable solvent. Thus, for instance, such a concentrate can comprise about 2 to 10 pounds, e.g., 4 pounds, of pentachlorophenol dissolved in one gallon of a liquid polyalkylene oxide solvent such as a lower polyalkylene glycol or glycol ether. Prior to use such a concentrate is then diluted with a petroleum hydrocarbon to provide a treating solution containing about 1 to 10%, e.g., 5% pentachlorophenol. When used for treating poles, fence posts and other unfinished wood, the concentrate can be diluted with a low cost petroleum oil, e.g., a No. 1, 2 or 3 light fuel oil having a viscosity below about 125 S.U.S. at 100° F. To minimize handling hazards, it is desirable to use hydrocarbon solvents having a flash point of 100° F. minimum.

Optionally, when it is desired to treat mill work or finished lumber, it is usual to prepare a water repellent concentrate. In addition to pentachlorophenol and the polyalkylene glycol or other suitable simple or mixed solvent, such a concentrate may contain minor amounts of other components soluble therein; such as a hydrocarbon resin e.g., a coumarone-indene polymer or a rosin-derived resin and/or paraffin wax to act as a sealer and water proofing agent; an alkyl phenol such as di-tert butyl paracresol or an ester of a lower molecular weight alkyl carboxylic acid to act as a corrosion inhibitor; etc. Prior to use, this concentrate is further diluted with mineral spirits, Stoddard solvent, or similar light refined hydrocarbon fractions to give a light colored mixture of suitable viscosity for wood treatment, containing about 5% pentachlorophenol. Considerable quantities of ready-to-use water-repellent products are also sold directly to users such as mill work companies. Such products have the mineral spirits or other refined hydrocarbon solvent already added by the compounder in sufficient proportion to give the desired strength of the active ingredient, e.g., 5% pentachlorophenol.

Pentachlorophenol concentrates and solutions of the kind described above are usually clear when they are prepared using an oxygen-containing organic solvent such as a glycol, and they are also usually clear when they are first mixed with a hydrocarbon solvent. However, a flocculent precipitate or sludge soon forms after dilution of the glycol solution with a hydrocarbon solvent. This precipitate is, of course, objectionable in wood treating operations and has heretofore required filtering the treating solution or decanting it from the precipitate prior to use. Water washing has also sometimes been used to reduce the precipitate but water washing in itself can cause difficulties because of emulsion formation, etc.

It has now been discovered that such sludge formation can be effectively prevented by including certain acid compounds in the liquid pentachlorophenol solutions or concentrates. More particularly, it has been found advantageous to include such acid compounds in the concentrate which contains pentachlorophenol in solution in an oxygen-containing solvent such as a glycol. Such addition is most effective when it is made either before, or in any event not substantially after, dilution of such a pentachlorophenol concentrate with a less potent solvent such as mineral spirits, cycle oil or other hydrocarbon solvent.

The acid sludge inhibitor may be introduced into the concentrate either by separate addition or by coating or otherwise mixing solid pentachlorophenol with an appropriate small amount of the inhibitor before dissolving the solid pentachlorophenol in the oxygen-containing solvent.

All percentages and proportions of materials are stated herein on a weight basis unless otherwise indicated.

Examples of stabilized concentrates or solutions

For the purpose of illustrating the effectiveness of the present invention a number of water repellent pentachlorophenol concentrates were prepared employing the following basic formula:

|  | Parts by weight |
|---|---|
| Pentachlorophenol | 21.20 |
| Paraffin wax | 4.15 |
| Mineral spirits | 38.90 |
| Soluble hydrocarbon resin (Piccocizer R) | 17.90 |
| $HO(C_3H_6O)_2 \cdot C_3H_6OH$ | 16.60 |
| Corrosion inhibitor ("Santolene C") | 0.40 |
| Additive as indicated | 0.85 |

The above materials were weighed into a glass beaker and heated between about 150° and 160° F. with constant stirring until all of the components formed a homogeneous mixture. Stirring was continued for ten minutes while keeping the temperature from exceeding 160° F. during the preparation of this solution. A small quantity of mineral spirits was added to compensate for approximately one percent lost during the heating and stirring step. The mineral spirits had a boiling point of 100° F. The pentachlorophenol used was a commercial product, technical grade, which had a melting point of about 360° F. and was prepared by catalytic chlorination of phenol.

The water repellent concentrate could be used to evaluate the effect of the additives, but for convenience of observation, 20 ml. of the concentrate described above was diluted with 80 ml. of mineral spirits to give 100 ml. total volume. After thorough mixing, the 100 ml. of solution was poured into a 100 ml. graduated, oil centrifuge tube. Each of these tubes had a stem graduated in 0.1 ml. divisions so that the volume of flocculent precipitate could be read to 0.1 ml. accuracy. The mixtures were allowed to stand overnight and the volume of sediment read the next day.

Most of the potential additives tested were made up at several different concentration levels. The concentrations employed in most cases were in the range of from 1 to 6% additive based on the pentachlorophenol, but lower and higher concentrations were also found to be effective.

Table I shows the results of the tests. A control was also run which included all of the components of the basic formula described above except that no additive was employed.

Other tests, not included in the table, showed that the additives found to be effective in the basic formula described above were also effective in reducing the amount of flocculent material in Four-Pound Pentachlorophenol Concentrate, i.e. in a commercial product containing four pounds of pentachlorophenol per gallon of total mixture. For instance, such a product formulated in accordance TABLE I.—EVALUATION OF ADDITIVES IN COMPOUNDED PENTA-CHLOROPHENOL WATER REPELLENT READY-TO-USE SOLUTION

[Volume percent flocculent material after standing at room temperature overnight]

| Additive | Concentration [1] of additive | | | | | | |
|---|---|---|---|---|---|---|---|
|  | 0.0 | 0.2 | 1.0 | 2.0 | 3.0 | 4.0 | 6.0 |
| None | 1.4 | | | | | | |
| Stearic acid | | | 0 | <.1 | 0 | <.1 | <.1 |
| Tartaric acid | | | | | | ([2]) | |
| Linoleic acid | | | 0 | 0 | 0 | 0.1 | 0.1 |
| Decanoic acid | | | <.1 | <.1 | <.1 | <.1 | <.1 |
| Myristic acid | | | <.1 | 0 | 0 | 0 | 0 |
| Octanoic acid | | | <.1 | <.1 | <.1 | <.1 | <.1 |
| Palmitic acid | | | 0.1 | <.1 | 0 | 0 | 0 |
| p-Toluic acid | | | ([2]) | ([2]) | | | |
| Lactic acid | | | 0.8 | 0.6 | 0.8 | 1.0 | |
| Lauric acid | | | <.1 | <.1 | <.1 | 0 | |
| Propionic acid | | | | 0.25 | | | 0 |
| Oleic acid | | | <.1 | <.1 | <.1 | <.1 | 0 |
| Butyric acid | | | 0.2 | | | | |
| p-Chlorobenzene sulfonic acid | | | 0.2 | | | 1.1 | |
| Docosanoic acid | | | 0 | 0 | | | |
| Alkyl Sulfonic acid | | | <0.1 | 0 | | 0 | |
| Lauryl Sulfuric acid | | | | | | 0 | |
| Ricinoleic acid | | | | | | 0.1 | |
| Mixed distilled animal fatty acid [3] | | 0.5 | 0 | 0 | 0 | 0 | 0 |
| Naphthenic acid, M.W. 310 | | | | | | 0 | |
| t-C$_{12}$-C$_{14}$ alkyl amide | | | | | | 0.6 | |

[1] Concentration expressed in weight percent of additive based on weight of pentachlorophenol in the formulation.
[2] Not soluble in mixture.
[3] Average molecular weight equivalent to lauric acid, acid value 201–206.

As indicated by the tabulated data, the effective additives, notably the aliphatic hydrocarbyl carboxylic acids having 5 to 10 carbon atoms, and more particularly the saturated and mono-unsaturated alkanoic or alkenoic acids having about 8 to 20 carbon atoms per molecule, when used in a concentration of between about 0.1 and about 10 percent based on the weight of pentachlorophenol present in the formulation, either completely eliminate the fluocculent material or reduce the volume of sediment formed to 0.1 ml. or less as compared to a sediment volume of 1.4 ml. in the control. Stated differently, the effective additives reduce the volume of sludge formed to about 7% or less of that formed without such additive. The use of saturated fatty acids of 12 to about 18 carbon atoms, such as myristic, palmitic and stearic acids, or of mixtures of such acids, in concentrations of about 0.5 to 3% or more based on the pentachlorophenol, is particularly preferred. However, useful results can also be obtained with the lower acids such as valeric, neo-pentanoic, pelargonic, and capric acids; with the higher saturated acids such as arachidic, behenic and abietic acids; with unsaturated acids containing one or two double bonds, such as oleic acid and linoleic acid; the various commercially available grades of tall oil acids; naphthenic acids, e.g., those having a molecular weight in the range of from about 180 to 400; and also with C$_5$ to C$_{20}$ alkyl sulfuric and sulfonic acids such as lauryl sulfuric and lauryl sulfonic acid.

Substituted carboxylic acids are suitable only when they contain an oleophilic group, e.g., an unsubstituted terminal group of at least six carbon atoms extending beyond the substituent such as a hydroxyl group. Thus, ricinoleic acid which contains a terminal C$_6$ alkyl group extending beyond the hydroxyl group is useful for purposes of the present invention. In contrast, lactic acid, which has only a methyl group extending beyond the carbon on the chain to which the hydroxyl substituent is attached is not satisfactory.

with the present invention may have the following composition:

Composition: Percent by weight
- Pentachlorophenol _____ 41.0
- HO(C$_3$H$_6$O)$_2$·C$_3$H$_6$OH _____ 25.0
- Lauric acid _____ 1.8
- Light petroleum cycle oil _____ 32.2

Total _____ 100.0

Such products can be diluted with locally available oils by the lumber treating company prior to use. The inclusion of the fatty acid in the Four-Pound Penta Concentrate is effective in reducing the amount of fluocculent precipitate even when a low quality petroleum oil is used in the dilution.

Example of coated pentachlorophenol flakes

Instead of adding the sludge inhibitor to the liquid pentachlorophenol concentrate it is also possible to obtain the benefits of the present invention by associating the inhibitor with the solid pentachlorophenol flakes, granules or the like before they are dissolved in a solvent. For instance, the sludge formation usually encountered in pentachlorophenol solutions can be avoided by coating solid pentachlorophenol flakes with a small amount of one of the acid compounds described earlier herein, e.g. by dissolving a fatty acid in a volatile solvent such as n-hexane, spraying the resulting solution on flakes of pentachlorophenol to apply a substantially uniform coating of solution thereto, and evaporating the volatile solvent. This is illustrated by the following data.

2 parts of palmitic acid was dissolved in 20 parts of n-hexane and the mixture was sprayed on 100 parts of flaked pentachlorophenol (approx. 6–8 mesh) while tumbling the pentachlorophenol particles in a kiln-like rotating can. Upon evaporation of the hexane, pentachlorophenol particles containing a substantially uniform, thin coating of palmitic acid in an amount corresponding to about 2% by weight of the pentachlorophenol were obtained. The resulting coated particles were then employed to make a 5% solution by dissolving 5 parts of these particles in 95 parts of a solvent mixture comprising 6 parts of polypropylene glycol (mol. weight 192) and 89 parts of mineral spirits. No precipitate was obtained.

It should be understood that while in the foregoing parts of the specification only a limited number of solvents has been described in connection with the preparation of the pentachlorophenol solutions embodying the present invention, the latter is not limited to the use of any particular solvent. On the contrary, the present invention broadly provides a means for counteracting the sludge-forming tendency which is inherent in commercial pentachlorophenol and which is essentially independent of the particular solvent used in forming the eventual pentachlorophenol solution. Without wishing this invention to be limited to any particular theory, it is suggested that the sludge formation usually encountered in the preparation and use of pentachlorophenol solutions is due to the presence of some unknown by-product or impurity which is formed in the pentachlorophenol during its manufacture and which, though initially soluble in the solvents customarily used in preparing pentachlorophenol treating solutions, becomes insoluble when the solutions become contaminated with moisture.

Accordingly, the present invention is useful in conjunction with all kinds of solvents or solvent mixtures in which pentachlorophenol is soluble in the required concentration. Thus, for instance, when making up a concentrate the pentachlorophenol may be dissolved in a primary solvent or mixture of primary solvents such as $C_1$ to $C_8$ or higher alkanols such as methanol, ethanol, a butanol, an octanol, etc.; alkyl esters of a lower carboxylic acid such as ethyl acetate, methyl amyl acetate, n-butyl propionate, etc.; pine oil or monocyclic terpene alcohols or terpenes; ketones such as acetone, methyl ethyl ketone, methyl isobutyl ketone, diacetone alcohol, etc.; alkoxy glycols such as ethoxytriglycol, butoxytriglycol, etc.; or, preferably alkylene glycol ethers, polyalkyleneglycols or polyalkyleneglycolo ethers. The particularly preferred glycol type solvents comprise at least one ether linkage per molecule, i.e., liquid polyethylene glycols, polypropylene glycols, their mono- and diethers, as well as the alkyl mono- and diethers of ethylene glycol and of propylene glycol.

The ethylene glycol type solvents most useful herein can accordingly be represented by the formula $$R_aO(-C_2H_4O)_x-R_b$$

wherein $R_a$ and $R_b$ can be either the same or different and are selected from the group consisting of hydrogen, alkyl radicals of from 1 to about 4 carbon atoms, and acetate or similar lower alkanoic acid radicals, and wherein $x$ is an integer in the range from 1 to about 10. The propylene glycol type solvents similarly, can be represented by the formula $R_cO(-C_3H_6O)_y-R_d$ wherein $R_c$ and $R_d$ can be either the same or different and are selected from the group consisting of hydrogen, alkyl radicals of from 1 to about 4 carbon atoms, and lower alkanoic acid radicals and wherein $y$ is an integer in the range from 2 to about 40, etc.

Representative examples of suitable polyalkylene glycol solvents include diethylene glycol, triethylene glycol, decaethylene glycol, diethylene glycol monoethyl ether, diethyleneglycol mono-n-butyl ether, diethylene glycol monoethyl ether acetate, dipropylene glycol, tetrapropylene glycol, pentapropylene glycol dimethyl ether, etc.

Customarily, in making up commercial pentachlorophenol solutions, primary solvents are used as mixtures with each other or with one or more auxiliary solvents of still other types. This is done to reduce the cost of the treating solution, to modify the evaporation characteristics of the solution, to facilitate inclusion therein of other constituents such as hydrocarbon resins or wax, or for other reasons. Such auxiliary solvents may accordingly include: aromatic hydrocarbon solvents such as benzene, toluene, xylenes, polymethyl benzenes, naphthalenes, methyl and polymethylnaphthalenes, other alkyl benzenes and naphthalenes; light aliphatic hydrocarbons such as liquefied propane, pentane and cetane; turpentine; various petroleum hydrocarbon fractions such as light cycle oil, gas oil, engine distillate, crankcase oil, diesel oil, kerosene, stove oil and fuel oils Nos. 1, 2 and 3; liquid glycerides such as corn oil, cottonseed oil, linseed oil, soy bean oil, tung oil and various fish oils; phenols, chlorophenols, various alkyl phenols; liquid chlorinated hydrocarbons such as carbon tetrachloride, chloroform, methylene chloride, methyl chloroform, ethylene dichloride, chloropropanes, chloropropenes, perchloroethylene, and trichloroethylene; etc.

The invention for which protection is desired is particularly pointed out in the appended claims.

What is claimed is:

1. A liquid preservative composition useful in the treatment of wood which comprises about 1 to 50% pentachlorophenol dissolved in an oxygen-containing liquid organic solvent therefor and a sludge inhibiting amount, in the range of from about 0.1 to 10% based on the pentachlorophenol, of at least one free acid selected from the group consisting of saturated aliphatic hydrocarbyl carboxylic acids having 5 to about 20 carbon atoms per molecule, unsaturated aliphatic hydrocarbyl carboxylic acids having 5 to about 20 carbon atoms and unsaturation consisting of not more than two double bonds per molecule, naphthetic acids having a molecular weight of the range of from about 180 to 400, ricinoleic acid $C_5$ to $C_{20}$ alkyl sulfuric acids and $C_5$ to $C_{20}$ alkyl sulfonic acids.

2. A liquid composition according to claim 1 wherein about 20 to 50% of pentachlorophenol is dissolved in a liquid alkylene glycol compound containing at least one ether linkage per molecule and corresponding to the formula $$RO(-C_nH_{2n}O)_x-R'$$

wherein $n$ is an integer of from 2 to 3 and $x$ is an integer from 2 to 10 and R and R' are selected from the class consisting of hydrogen, alkyl radicals of 1 to 4 carbon atoms and acetate radicals.

3. A liquid composition according to claim 1 wherein the solvent comprises a compound of the formula $HO(-C_3H_6O)_3H$.

4. A liquid composition according to claim 1 wherein the acid is a $C_{12}-C_{18}$ saturated fatty acid and is present in a concentration of 0.5 to 10% based on pentachlorophenol.

5. A liquid preservative composition useful in the treatment of wood which comprises about 1 to 10% pentachlorophenol dissolved in a solvent mixture comprising a major proportion of a liquid hydrocarbon solvent and a minor proportion of a liquid alkylene glycol compound containing at least one ether linkage per molecule and corresponding to the formula $$RO(-C_nH_{2n}O)_x-R'$$

wherein $n$ is an integer of from 2 to 3 and $x$ is an integer from 2 to 10 and R and R' are selected from the class consisting of hydrogen, alkyl radicals of 1 to 4 carbon atoms and acetate radicals, said composition further containing a sludge inhibiting amount, in the range of from about 0.1 to 10% based on the pentachlorophenol, of at least one free acid selected from the group consisting of saturated aliphatic hydrocarbyl carboxylic acids having 5 to about 20 carbon atoms per molecule, unsaturated aliphatic hydrocarbyl carboxylic acids having 5 to about 20 carbon atoms and unsaturation consisting of not more than two double bonds per molecule, naphthenic acids having a molecular weight in the range of from about 180 to 400, ricinoleic acid, $C_5$ to $C_{20}$ alkyl sulfuric acids and $C_5$ to $C_{20}$ alkyl sulfonic acids.

6. A preservative composition according to claim 5 wherein the acid is ricinoleic acid.

7. A liquid preservative composition useful in the treatment of wood which comprises:
  (a) about 1 to 70%, based on the total composition, of pentachlorophenol and
  (b) 0.1 to 10%, based on the pentachlorophenol, of at least one saturated fatty acid of about 12 to 18 carbon atoms per molecule,
said pentachlorophenol and said fatty acid being dissolved in
  (c) a solvent which comprises a polypropylene glycol of the formula $R_cO(-C_3H_6O)_y-R_d$ wherein both $R_c$ and $R_d$ are hydrogen and wherein $y$ is an integer in the range from 2 to 40.

8. A liquid preservative composition useful in the treatment of wood which comprises:
  (a) about 1 to 70%, based on the total composition, of pentachlorophenol and
  (b) 0.1 to 10%, based on the pentachlorophenol, of at least one saturated fatty acid of about 12 to 18 carbon atoms per molecule,
said pentachlorophenol and said fatty acid being dissolved in
  (c) a solvent which is a mixture of tripropylene glycol and light petroleum cycle oil.

9. A process for making pentachlorophenol granules or flakes having improved solubility characteristics which comprises spraying said granules or flakes with a solution of a saturated fatty acid of 5 to 20 carbon atoms per molecule dissolved in a volatile solvent to apply a substantially uniform coating of solution to the pentachlorophenol granules or flakes and evaporating the solvent, thereby forming a coating of fatty acid on granules or flakes in an amount corresponding to between about 0.1 to 10% acid based on pentachlorphenol.

10. A process for making pentachlorophenol granules or flakes according to claim 9 wherein the volatile solvent is hexane.

11. Solid pentachlorophenol granules or flakes coated with about 0.1 to 10%, based on the weight of pentachlorophenol, of a saturated aliphatic hydrocarbyl carboxylic acids having 5 to about 20 carbon atoms per molecule.

12. Solid pentachlorophenol granules or flakes coated with about 0.1 to 10% of palmitic acid based on the weight of the pentachlorophenol.

13. Solid pentachlorophenol granules or flakes coated with about 0.1 to 10% of stearic acid based on the weight of the pentachlorophenol.

14. Solid pentachlorophenol granules or flakes coated with about 0.5 to 10% of lauric acid based on the weight of the pentachlorophenol.

References Cited
UNITED STATES PATENTS

| | | | |
|---|---|---|---|
| 2,188,944 | 2/1940 | Fox et al. | 167—31 |
| 2,588,318 | 3/1952 | Benignus | 167—31 |
| 3,011,940 | 12/1961 | Bollenback | 167—31 |
| 3,044,926 | 7/1962 | Flavin et al. | 167—38X |
| 3,160,555 | 12/1964 | Hamill et al. | 167—31X |
| 3,281,318 | 10/1966 | Stutz | 167—31X |

ALBERT T. MEYERS, Primary Examiner

D. R. ORE, Assistant Examiner

U.S. Cl. X.R.

106—2